United States Patent [19]

Hoehener et al.

[11] Patent Number: 4,876,333
[45] Date of Patent: Oct. 24, 1989

[54] β-CRYSTALLINE MODIFICATION OF DIASAZO ACID DYESTUFF

[75] Inventors: Alfred Hoehener; Roy E. Smith, both of Toms River, N.J.

[73] Assignee: Ciba-Geigy Corporation, Ardsley, N.Y.

[21] Appl. No.: 787,354

[22] Filed: Oct. 15, 1985

[51] Int. Cl.$^4$ .................. C09B 67/24; C09B 67/48; C09B 67/54; D06P 1/39
[52] U.S. Cl. .................. 534/575; 534/831; 534/887; 8/681
[58] Field of Search .................. 534/575, 856, 831; 8/405, 408, 410, 414, 415

[56] References Cited

U.S. PATENT DOCUMENTS

| | | | |
|---|---|---|---|
| 2,519,924 | 8/1950 | Powell | 534/575 |
| 2,573,851 | 11/1951 | Lacey et al. | 534/575 |
| 2,765,300 | 10/1956 | Hein et al. | 534/575 X |
| 2,981,729 | 4/1961 | Kesler et al. | 534/575 |
| 3,862,119 | 1/1975 | Stingl | 534/831 |
| 3,932,376 | 1/1976 | Feeman | 534/831 |
| 3,956,270 | 5/1976 | von Rambach et al. | 534/575 |
| 4,002,605 | 1/1977 | Balsley et al. | 534/575 |
| 4,014,866 | 3/1977 | Henning | 534/575 X |
| 4,045,425 | 8/1977 | Hunter | 534/887 X |
| 4,074,965 | 2/1978 | Kruse et al. | 534/575 X |
| 4,332,588 | 6/1982 | Eugster et al. | 534/575 X |
| 4,468,230 | 8/1984 | Thomas et al. | 534/887 X |
| 4,474,577 | 10/1984 | Sandefur et al. | 534/575 X |
| 4,567,171 | 1/1986 | Mangum | 534/887 X |

FOREIGN PATENT DOCUMENTS

| | | | |
|---|---|---|---|
| 2524187 | 11/1976 | Fed. Rep. of Germany | 534/575 |
| 2536052 | 2/1977 | Fed. Rep. of Germany | 534/575 |
| 3222909 | 12/1983 | Fed. Rep. of Germany | 534/831 |
| 3237369 | 4/1984 | Fed. Rep. of Germany | 534/831 |
| 55-84364 | 6/1980 | Japan | 534/575 |
| 1201456 | 8/1970 | United Kingdom | 534/831 |

OTHER PUBLICATIONS

Chemical Abstracts, vol. 99, #124028d and Formula Index, p. 1938F (1983).
Biedermann, J. Soc. Dyers & Colourists, vol. 87, No. 4, pp. 105 to 111 (1971).

Primary Examiner—Floyd D. Higel
Attorney, Agent, or Firm—Kevin T. Mansfield; Edward McC. Roberts

[57] ABSTRACT

A crystalline modification, designated "β", of the dye of the structure

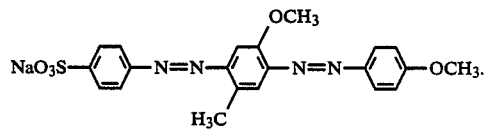

The β-crystalline modification of the dye is easier to isolate from water and gives filter cakes of higher solids and color content. The β-form is also more suitable for making liquid formulations of the dye; the liquid formulations of the crystalline modification have lower viscosity and better dispersion stability than liquid formulations of non-modified form. The β-modification of the dye is obtained by heating an aqueous slurry of the dye at about 90°–95° C. and pH of 8.5 to 9.5 until the modification is complete. The crystalline modification of the dye gives Debye-Scherrer X-ray diffraction patterns substantially different from the non-modified form.

3 Claims, 1 Drawing Sheet

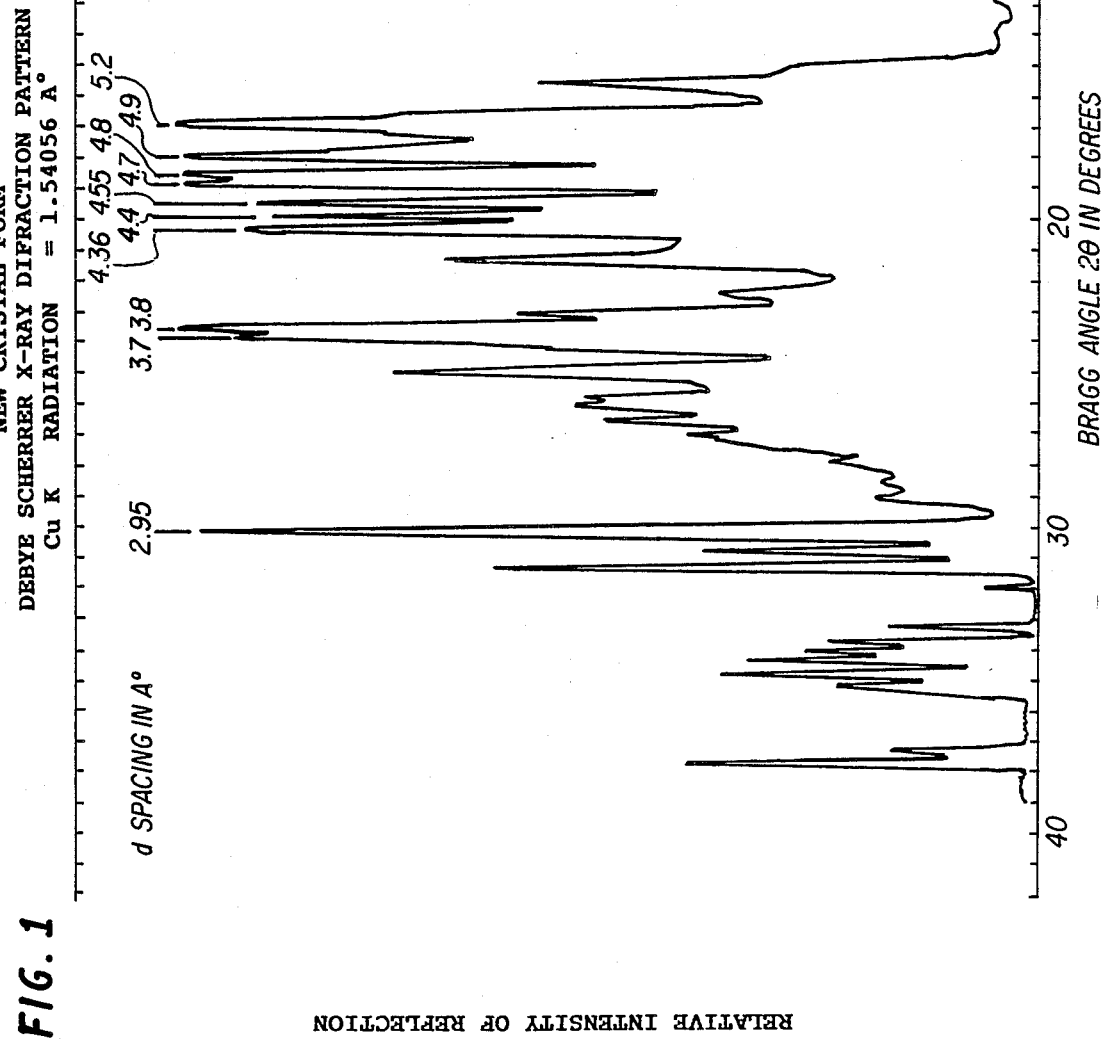

β-CRYSTALLINE MODIFICATION OF DIASAZO ACID DYESTUFF

FIELD OF INVENTION

The present invention pertains to the modification of the physical form of an acid dye to give the β-modification and to a process for obtaining this crystalline modification.

BACKGROUND OF THE INVENTION

Acid dyes were developed for application to the substrate from solution in a dye bath. The particular crystal form was not a matter of concern, since application was from solution and little was known about solubility behavior of different crystal forms. Attention to crystal form in the syntheses of acid and other water soluble dyes extended only to getting a form which could be separated from the reaction mixture with "reasonable" efficiency.

Conversely, the crystal forms of pigments have been thoroughly studied to achieve desired hues, maximum color yield and suitable vehicle emulsion stability. For example, see "The Chemistry and Physics of Organic Pigments", Lyde S. Pratt, John Wiley & Sons, Inc., New York, 1947. In recent years, the crystal form of "Disperse Dyes" has received much attention. This interest has generally been to achieve the crystal form stable to dye bath conditions from which they are applied to the fiber, e.g. U.S. Pat. Nos. 4,388,078; 4,374,640; 4,332,588; and references therein. Only one example of the modification of an acid dye has been reported, U.S. Pat. No. 4,474,577.

SUMMARY OF THE INVENTION

This invention concerns the crystallization and crystal modification of the dye of the following structure:

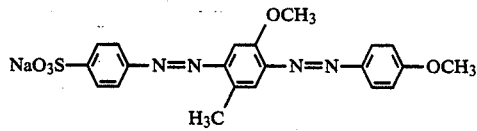

and a process for obtaining crystalline modifications, including the preferred crystalline modification, the β-modification.

The preferred modified dye crystals are characterized by Debye-Scherrer X-ray diffraction patterns whose Bragg angles 2 and strengths are shown below:

| Bragg Angles 2θ (deg.) and d Spacings (Å) | | | | | |
|---|---|---|---|---|---|
| Relative Reflection Strength | Preferred β-Crystal Modification | | Relative Reflection Strength | Original Form | |
| | 2θ | d | | 2θ | d |
| medium | 6.45 | 13.6 | very strong | 6.4 | 13.8 |
| very strong | 16.9 | 5.2 | medium | 8.5 | 10.4 |
| strong | 18.0 | 4.9 | strong | 15.6 | 5.7 |
| strong | 18.5 | 4.8 | strong | 18.2 | 4.9 |
| strong | 18.9 | 4.7 | strong | 18.6 | 4.77 |
| medium | 19.5 | 4.55 | medium | 23.5 | 3.8 |
| medium | 20.0 | 4.4 | medium | 24.1 | 3.67 |
| medium | 20.4 | 4.35 | | | |
| very strong | 23.6 | 3.8 | | | |
| medium | 23.9 | 3.7 | | | |
| very strong | 30.3 | 2.95 | | | |

FIG. 1 is an X-ray diffraction pattern tracing of the preferred β-modification crystals.

DETAILED DESCRIPTION

This invention pertains to the crystallization and the modifications of the crystal structure of the dye of the above structure which are obtained by subjecting an aqueous dispersion of the dye to heat treatment conditions at a pH within a narrow range. This dye as recovered in its initial synthesis condition appears in an amorphous state with little or no crystal form present. Under crystallization conditions to the desired state, the dye appears as yellow metallic platelets under microscopic examination. X-ray diffraction patterns show that intermediate transformations occur before the β-crystal form is reached. Crystal formation and modification is further confirmed by optical and color changes and microscopic examination which shows that the dye undergoes a transformation from an amorphous form to crystals observed as platelets. The β-crystal form of the dye filters and washes better than does the original amorphous state or intermediate crystal forms. The dye is purer when isolated in the β-crystal form than when isolated in its amorphous state or intermediate crystal forms. For example, if both forms are isolated from an aqueous medium by filtration and dried, the β-crystal form will show a spectral strength of 238 to 250 with an average of about 243, whereas, the amorphous product will show strengths of 200 to 228 with an average strength of about 217. The base strength of 100 corresponds to the expected strength of the commercially formulated dye. The β-crystal form of the dye is more suitable for use in liquid formulations than are the amorphous form or intermediate crystal forms. The β-crystal form of the dye results in faster, easier filtration, to give a better filter cake and a product of higher solids. The filter cakes of the amorphous dye average 40% solids, whereas, solids of the modified crystal cakes average 55% or higher solids. This is important from a material-handling viewpoint. It is also important to get a high-solids filter cake because it allows use of the cake directly to generate concentrated liquid formulations without drying the cake. Also it is more cost efficient to dry a highly-concentrated cake when a dry form is desired.

The desired modifications are obtained by heating the dye slurry at temperatures above 80° C. and at a pH range of 8.5–10.0. The preferred temperature range is about 90°–100° C. The preferred pH range is 8.5 to 9.5. When the pH is above about 9.5, there may be sufficient solubility so that the dye in solution is not affected by the procedure. When the pH is below 8.0, the dye is partially converted to its free acid form which undergoes crystal modification, but does not give the desired properties. Conversion to the desired crystal form occurs rapidly once the desired pH and temperature are attained.

Conversion is usually complete within one to two hours and can be observed visually as the production of a metallic-appearing, free-floating suspension. There is further a visual change from a gel or sponge appearance to a low viscosity free-flowing suspension.

The concentration of the aqueous dispersion being treated is not critical as long as the dye is out of solution. Salt may be effectively added to the dye dispersion at the treatment temperature to displace the dye from solution if necessary. There is usually sufficient salt present from the synthesis to achieve insolubility. If additional electrolyte is required, any of those commonly used is acceptable. Although alkali and alkaline earth salts of mineral acids are preferred for economic reasons, salts of lower molecular weight organic acids may be used. Ammonium salts are likewise effective but are ecologically undesirable.

The method of synthesis of the dye also produces a mixture of sodium chloride and sodium sulfate. There will be sodium methylsulfate present in the reaction mixture if the hydrolysis step is not carried to completion.

The present invention also includes the process of crystallization and crystal modification for the dye. The crystal modification process of this invention comprises heating an aqueous slurry of the dye to a temperature of about 80° to 100° C. at a pH of about 8.5-9.5 and stirring for about one-half hour up to about two hours.

The preferred procedure for treating the dye is to heat the reaction mixture after the synthesis is complete. However, crystal formation and modification can be achieved by treating the dye in any of its forms. The filter cake, the dried crude, or the final standardized form may be treated as well, with only variations of salt addition to the aqueous dispersion as needed to render the dye insoluble and to achieve the desired conversion. The invention is further illustrated, but is not limited by the following examples in which all parts and percentages are by weight unless otherwise noted.

EXAMPLES

The dyestuff, in its amorphous form is prepared according to the method taught in U.S. Pat. No. 3,862,119 which issued Jan. 21, 1975 on application of Hans Alfred Stingl. Alternatively, and preferably, the method of U.S. Pat. No. 3,862,119 is used except that an equivalent amount of dimethyl sulfate is substituted for the methyl chloride taught therein. Without isolation of the methylated dye, in the presence of a slight excess of dimethyl sulfate, the reaction mixture is directly treated to give the β-crystaline form of this invention.

A reaction mixture containing approximately 10 g of dye and 8 to 10 g of salt and by-products in a volume of 100 mls of aqueous suspension at a pH of 10.0 to 11.0 was heated to 90° C. and held at that temperature until the pH stabilized, that is until all excess dimethylsulfate was hydrolyzed. The pH was then adjusted to 8.5 to 9.5 as necessary and the dispersion was heated at 90° to 95° C. for about one hour until the β-crystal form was obtained.

There was a visible change in form after heating for about one-half hour and there was no further change noticeable after about one hour, at which time examination under the microscope showed only platelets. The modified β-crystal form of dye was isolated by cooling to 70° C. and filtering. The filtration time on a 12 cm diameter #3 Whatman filter paper with 24 inches of mercury vacuum was less than one minute. The solids content of the filter cake determined by drying was 55%.

In another example, 100 g of filter cake of amorphous dye at 45% solids and a dye strength of 227 was stirred into 300 ml water. The volume was adjusted to 450 ml, and the pH was adjusted to 9.5. The solution which resulted was heated to 90° C.; 45 g sodium chloride was then added. The dye precipated in amorphous form. After the precipitate and medium was heated at 90° C. for one hour, the β-crystalline material was isolated by filtration on a 12 cm #3 Whatman filter in approximately one minute. The cake was washed with 100 ml of 1% sodium chloride. There was thus obtained 78 g of β-crystal cake at 55% solids and a sprectral strength of 248.

A preferred use of the β-crystal modification of this invention is the manufacture of liquid formulations in the manner of copending application Ser. No. 590,234, now U.S. Pat. No. 4,567,171, to Thomas A. Mangum.

We claim:

1. The β-crystalline form of the dyestuff of the formula

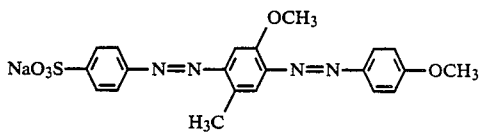

displaying Debye-Scherrer X-ray diffraction pattern reflections representative of d-spacings (Å) as follows: 13.6(medium), 5.2(very strong), 4.9(very strong), 4.8(strong), 4.7(strong), 4.55(medium), 4.4(medium), 4.35(medium), 3.8(very strong), 3.7(medium), 2.95(very strong).

2. The β-crystalline form of the dyestuff of the formula

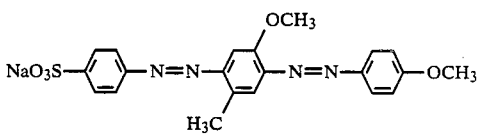

characterized by the X-ray diffraction pattern of FIG. 1.

3. A liquid dye composition which comprises a dye of claim 1, a dispersant therefor and water.

* * * * *